United States Patent [19]

Lunde et al.

[11] 4,033,038

[45] July 5, 1977

[54] CHAIN SAW COUPLING MECHANISM

[75] Inventors: James M. Lunde, Taylors Falls; John G. Schwartz, Jr., South St. Paul, both of Minn.

[73] Assignee: Osceola Clutch & Brake Company, Minneapolis, Minn.

[22] Filed: July 30, 1976

[21] Appl. No.: 710,176

[52] U.S. Cl. ................................ 30/382; 192/17 R

[51] Int. Cl.$^2$ .................... B27B 17/10; F16D 15/00

[58] Field of Search ............ 30/381, 382, 383, 384, 30/385, 386; 192/12 B, 14, 17 R, 36

[56] References Cited

UNITED STATES PATENTS

| | | | |
|---|---|---|---|
| 2,299,621 | 10/1942 | Giffen | 192/17 R |
| 2,308,679 | 1/1943 | Eason | 192/17 R |
| 2,308,680 | 1/1943 | Eason | 192/17 R |
| 3,785,465 | 1/1974 | Johansson | 30/383 |
| 3,857,180 | 12/1974 | Dooley | 30/383 |
| 3,958,680 | 5/1976 | Armbruster | 30/383 X |
| 3,991,864 | 11/1976 | Muller | 30/383 X |

*Primary Examiner*—Al Lawrence Smith

*Assistant Examiner*—J. C. Peters

*Attorney, Agent, or Firm*—Merchant, Gould, Smith, Edell, Welter & Schmidt

[57] ABSTRACT

A clutch operable manually to couple and uncouple a driven member from a drive shaft and to stop movement of the driven member upon uncoupling of the same. A driving clutch plate and a reaction member are fixed on the drive shaft and axially spaced apart thereon. A driven clutch plate and a cooperating actuating and output member, mounted on the drive shaft between the driving clutch plate and reaction member, provide an axially expansible and contractible clutch assembly, the actuating and output member having driving engagement with the driven member. Actuator means, carried by the driven clutch plate and the actuating and output member, limits rotary movement between the driven clutch plate actuating and output member, and causes the clutch assembly to vary between expanded and contracted conditions. A stopping device is arranged to prevent rotation of the driven clutch plate.

12 Claims, 6 Drawing Figures

CHAIN SAW COUPLING MECHANISM

BACKGROUND OF THE INVENTION

This invention relates generally to drive mechanisms for power operated devices, and more particularly to improvements in coupling devices for operatively connecting a driven member, such as a saw chain to a motor operated drive shaft, and disconnecting the same therefrom when necessary or desired. Some devices heretofore provided have used centrifugal clutch mechanisms and other releasable transmission connections, some of these being rather complex and bulky.

SUMMARY OF THE INVENTION

An important object of this invention is the provision of coupling mechanism for a driven member which is of highly simplified structure having few parts and taking up a relatively small space, and which is highly effective in operatively connecting and disconnecting the driven member from the drive shaft and stopping movement of the driven member when the same is operatively disconnected from the drive shaft.

To the above ends, a drive shaft is provided, together with a driving clutch plate fixed to said shaft, and a reaction member carried by said shaft and having a shoulder defining with said driving clutch plate a space along said shaft of known axial dimensions. A clutching assembly is mounted in said spaced, and has a contracted condition, in which its axial dimension is less than that of said space to enable relative rotary motion of said shaft with respect to said assembly, and an expanded condition, in which it fully occupies said space for enforcing rotation of said assembly with rotation of said shaft. The clutching assembly comprises a driven clutch plate adjacent said driving clutch plate, an actuating and output member between said reaction member and said driven clutch plate and including means for engaing a driven member in driving relation, and actuator means carried in part by said driven clutch plate and in part by said actuating and output member, and operative responsive to rotary speed differential between said driven clutch plate and said actuating and output member to limit rotary motion between said driven clutch plate and said acutating and output member and to cause said assembly to vary between said contracted and expanded conditions. Means is further provided, operable to prevent rotation of said driven clutch plate, whereby to prevent movement of said driven member and to cause said actuator means to actuate said clutching assembly into contracted condition.

DETAILED DESCRIPTION OF THE PREFERRED EMBODIMENT

Figure 1:
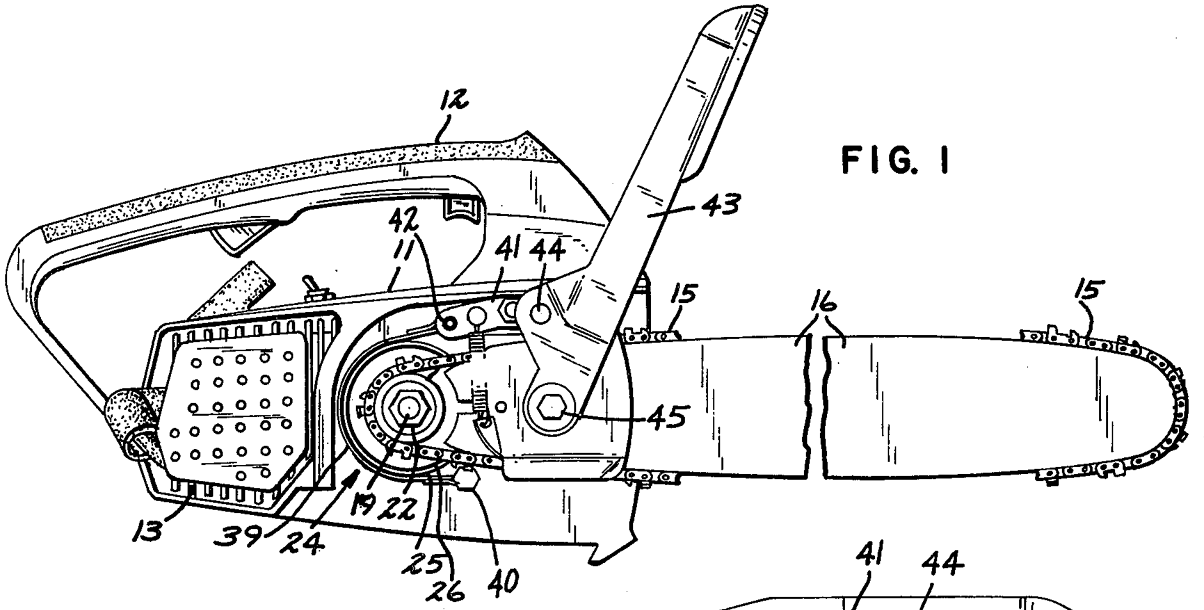
FIG. 1 is a view in side elevation of a chain saw including this invention.

In the drawings, a commercially available portable chain saw is fragmentary shown as comprising a frame 11 formed to provide a handle 12 and containing a motor in the nature of a conventional internal combustion engine 13 having a drive shaft 14. The engine 13 is used to impart movement to a saw tooth equipped endless cutting chain 15 that is entrained over an elongated plate-like guide bar 16 rigidly secured to the frame 11 and projecting forwardly therefrom. The chain saw thus far described is of well known construction and, in and of itself, does not comprise the instant invention, the same including one form of driven member; hence, further detailed description thereof is believed unnecessary, and is omitted in the interest of brevity. It should suffice to state that the drive shaft 14 is formed to provide a diametrically reduced screw threaded outer end portion 17.

Figure 3:
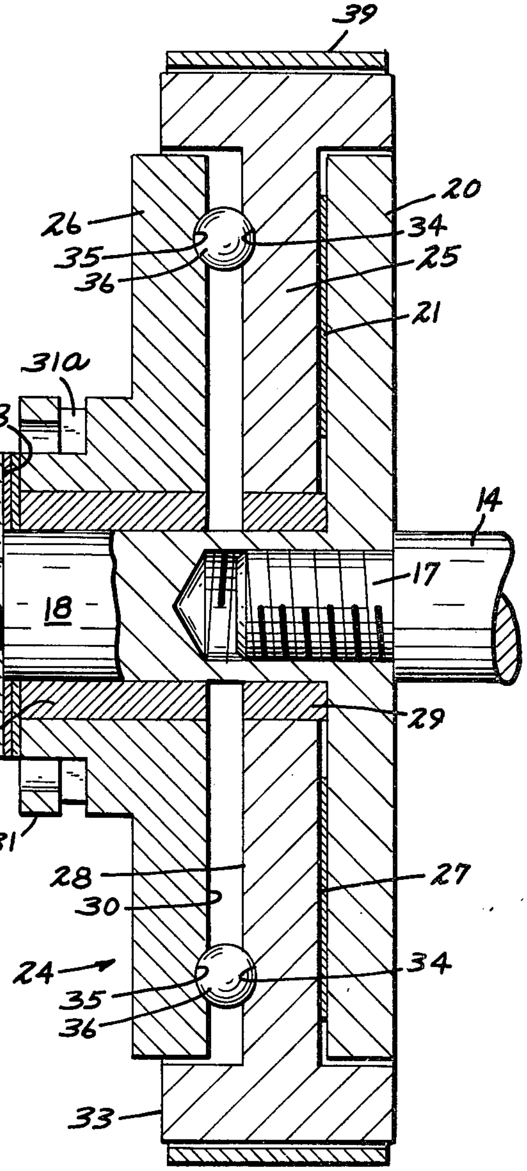
FIG. 3 is an axial section taken on line 3—3 of FIG. 2 on an enlarged scale.

A drive shaft element 18 is axially drilled and tapped at its inner end to be screw threaded on the threaded outer end portion 17 of the drive shaft 14, to be axially aligned with the drive shaft 14, and is formed to provide a screw threaded axially outwardly projecting reduced diameter outer end portion 19. At its inner end, the drive shaft element 18 is formed to provide a radially outwardly projecting flange or driving clutch plate 20 having a wear face or plate 21 thereon, see particularly FIG. 3, the wear plate 21 facing axially outwardly toward the outer end of the drive shaft element 18. Reaction means in the nature of a stop nut 22 is screw threaded on the outer reduced diameter end portion 19, and provides an annular shoulder 23 that is axially spaced from the wear face 21 a predetermined distance. It should here be noted that, while the drive shaft element 18 is shown and described as being mounted on the engine shaft 14, the engine shaft 14 may be formed to include the element 18 with its driving clutch plate portion 20, if desired.

An axially expansible and contractible clutching assembly, indicated generally at 24, comprises an annular driven clutch plate member 25 and a cooperating annular actuating and output member 26, the members 25 and 26 being disposed in the space between the driving clutch plate 20 and the annular shoulder 23, the driven clutch plate member 25 having axially opposite faces 27 and 28, the former of which is disposed in face-to-face relationship with the wear face 21. The driven clutch plate member 25 is journaled on the drive shaft element 18 by means of a bearing 29. The actuating and output member 26 is disposed in closely axially spaced relationship to the driven clutch plate member 25, and has an axially inner face 30 in opposing relationships to the face 28 of the driven clutch plate member 25. The actuating and output member 26 is formed to provide a hub portion 31 that is journaled on the drive shaft element 18 by means of a bearing 32. The driven clutch plate member 25 is further formed to provide an outer circumferential rim 33 that projects in axially opposite directions from the plate member 25 and closely encompasses the outer marginal edges of the driving clutch plate 20 and actuating and output member 26, for the purpose of excluding foreign matter within the clutch assembly and for a further purpose which will hereinafter become apparent. The hub 31 is formed to provide circumferentially spaced sprocket teeth 31*a* that have meshing engagement with the cutting chain 15. The actuating and output member 26, like the driven clutch plate member 25, is capable of axial movement on the drive shaft element 18, the axially outer end of the hub 31 being operatively engageable with the annular shoulder 23 of the reaction means or stop nut 22.

Rotary motion of the drive shaft 14 and drive shaft element 18 is imparted to the actuating and output member 26 by axial expansion of the clutching assembly 24 to the point wherein the hub 31 operatively engages the annular shoulder 23 and the face 37 of the driven clutch plate member 25 is pressed against the wear face 21 of the driving clutch plate 20 with sufficient pressure to cause the driven clutch plate 25 to be rotated with the driving clutch plate 20. The members 25 and 26 are moved away from each other, and rotation is imparted to the member 26 from the member 25 by actuator means including cooperating circumferentially extended cam faces 34 and 35 on members 25 and 26 respectively, and sperical cam followers 36 engaging opposed pairs of the cam faces 34 and 35, see particularly FIG. 4. As therein shown, the cam faces 34 and 35 are disposed at the bottoms of grooves cut in the face 28 of the driven clutch plate member 25 and in the adjacent surface of the actuating and output member 26, the faces 34 and 35 being angularly displaced from the respective surfaces of the members 25 and 26 respectively. At one end, each of the cam faces 34 and 35 extend generally axially of their respective members 25 and 26 to form abutment portions 37 and 38 respectively.

Figure 2:
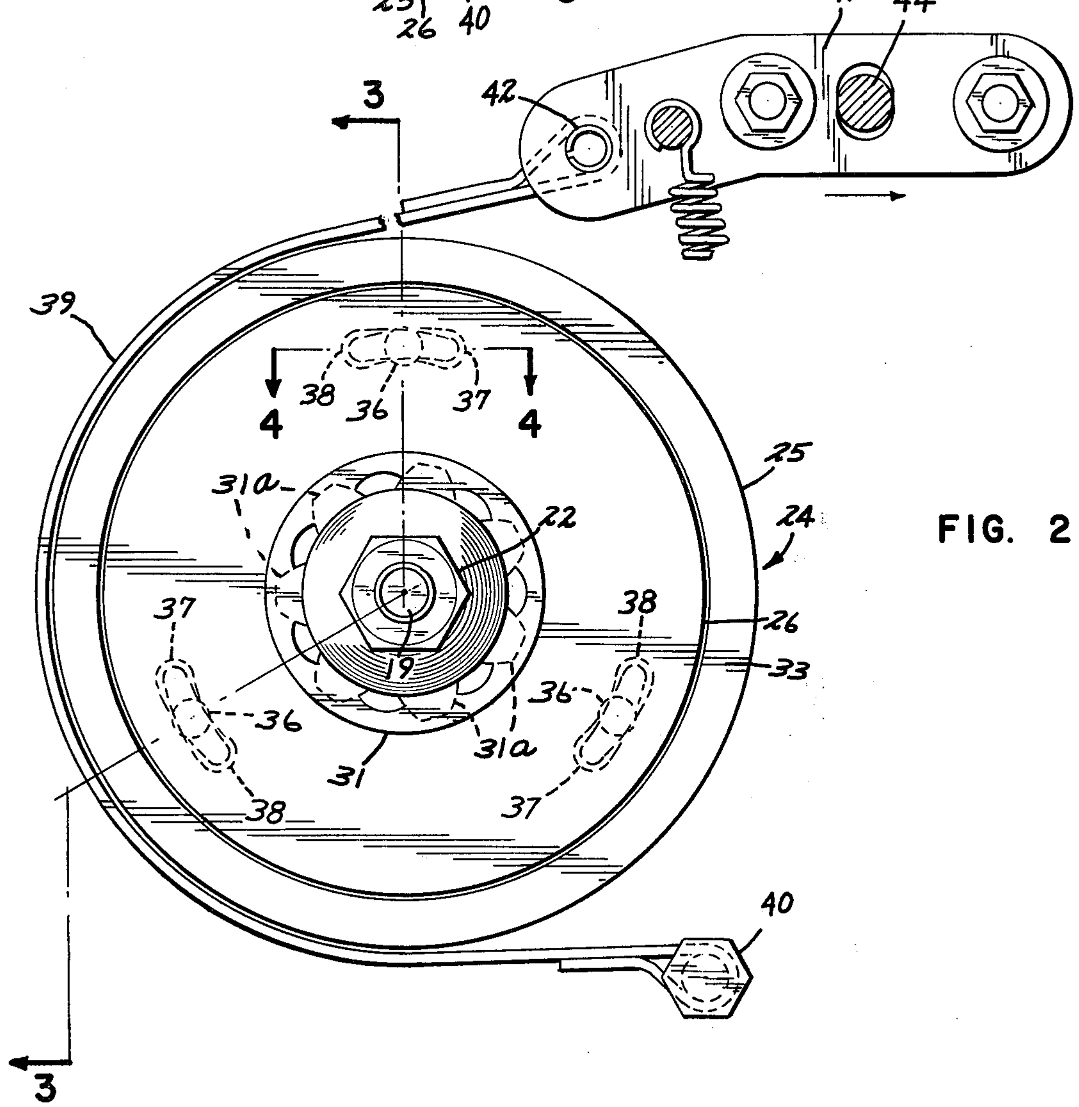
FIG. 2 is an enlarged fragmentary view corresponding to a portion of FIG. 1.
Figure 4:
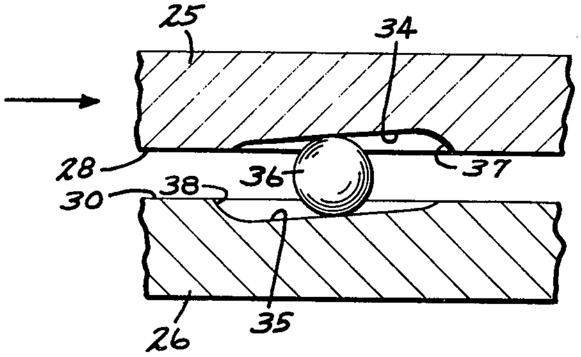
FIG. 4, is a further enlarged fragmentary section taken on the line 4—4 of FIG. 2.

Rotation of the driven clutch plate member 25 in a clockwise direction with respect to FIGS. 1 and 2, and in the direction indicated by the arrow in FIG. 4, causes a spherical cam follower to move with respect to the cam faces 34 and 35 in a direction to tend to spread the members 25 and 26 axially apart to fill the space between the driving clutch plate 20 and annular shoulder 23, and to impart frictional driving pressure to the face 27 of the driven clutch plate member 25 against the wear face or plate 21 of the driving clutch plate 20. With such pressure applied, rotation of the driven clutch plate member 25 is transferred to the actuating and output member 26 through the cam followers 36 so as to impart cutting movement to the cutting chain 15. Thus, it will be seen that the actuator faces 34 and 35 and cam follower 36 are operative responsive to a differential in rotary speed between the members 25 and 26 to cause the assembly 24 to vary between the contracted and expanded conditions thereof.

The rim 33 of the driven clutch plate member 25 is partially encompassed by a flexible brake band 39 that is anchored at one end to the frame 11 by means of an anchoring pin 40. The opposite end of the brake band 39 is connected to one end of a shiftable link 41, as indicated at 42, the link 41 being movable in directions to cause braking engagement and disengagement between the brake band 39 and the outer peripheral surface of the rim 33. The opposite end of the line 41 is connected to a brake operating lever 43 by means of a connector pin 44, the lever 43 being pivotally mounted at its lower end to the frame 11, as indicated at 45. The lever 43 extends upwardly to a point above the top of the frame 11, from whence it may be assumed to extend laterally inwardly over the frame 11 so as to engage the wrist or arm of an operator holding the chain saw in the usual manner during use. When the lever 43 is pushed forwardly about the axis of its pivotal mounting to the frame 11, at 45, the brake band 39 engages the rim 33 to stop rotation of the driven clutch plate member 25. Movement of the upper end of the lever 43 in a rearward direction causes the brake band 39 to release its grip on the rim 33, so that the driven clutch plate member is free to rotate. Although not shown, it may be assumed that the link 41 and frame 11 are provided with well known detent means for releasably holding the line 41 in either of its brake operating or release positions.

The flexibility of the brake band 39 permits the driven clutch plate member 25 to partake of a slight axial movement relative to the driving clutch plate 20 when the lever 43 is moved to its forward position, whereby to apply braking effort against the rim 33. As soon as the brake is applied to the rim 33, the driven clutch plate member 25 will rotate at a slower speed than the actuating and output member 26 so that the sperical cam followers 36 will be moved to the abutment portions 37 and 38 of their respective cam faces 34 and 35, thus permitting the clutching assembly 24 to contract axially with respect to the drive shaft element 18 and slow down rotation of the actuating and output member 26 to the same speed as that of the driven clutch plate member 25. Thus, as soon as the driven clutch plate member 25 stops, the actuating and output member 26 will also stop. As soon as the clutching assembly 24 begins to contract axially, driving pressure of the driven clutch plate member 25 against the wear face 21 of the driving clutch plate 20 is relieved to a point wherein there is free sliding engagement between the face 27 and the wear face 21, or even a slight clearance therebetween. When the brake is released, both the driven clutch plate member 25 and actuating and output member 26 will tend to rotate, due to the slight friction between their respective bearings 29 and 32 and the shaft element 18. Rotation of the actuating and output member 26 will be impeded by the load imparted thereto by the cutting chain 15, so that the driven clutch plate member 25 will rotate faster than the actuating and output member 26, causing the spherical cam followers 36 to move in a direction to axially expand the clutching assembly 24 to the full axial length of the space between the driving clutch plate 20 and the annular shoulder 23 and apply driving friction to the face 27 against the wear face 21 of the driving clutch plate 20. It will be appreciated that the transition between release of the brake band 39 from the rim 33 and full operating speed of the driven clutch plate member 25 and actuating and output member 26 is almost instantaneous, as is release of the driven clutch plate member 25 from the driving clutch plate 20 when pressure of the brake band 39 is applied against the rim 33. It will be further appreciated that, with the above-described construction, frictional driving pressure of the driven clutch plate member 25 against the driving clutch plate 20 increases as the cutting load of the cutting chain increases, so that slippage between the driving clutch plate 20 and driven clutch plate member 25 is substantially non-existent in view of the fact that increased load against the cutting chain 15 tends to reduce the rotary speed of the actuating and output member 26, causing the cam followers 36 to exert expanding pressure to the clutching assembly 24.

Modified Arrangements

Figure 5:
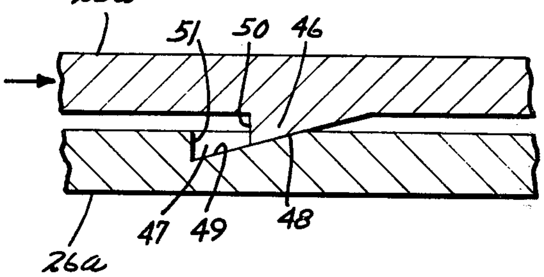
FIG. 5 is a view corresponding to FIG. 4 but showing a modified form of actuator means of this invention.

In the modified arrangement illustrated in FIG. 5, a driven clutch plate member is indicated at 25*a*, and a cooperating actuating and output member is indicated at 26*a*, the former having a plurality of circumferentially spaced teeth 46 and the latter being formed to provide a like plurality of recesses 47, one of each of which is shown, the recesses 47 being shaped similarly to the teeth 46. The teeth 46 and recesses 47 have cooperating cam surfaces 48 and 49 respectively and abutment surface portions 50 and 51 respectively. As shown in FIG. 5, the surfaces 48 and 49 are in direct engagement, without the necessity for an intermediate element such as the cam follower 36 of FIG. 4. When rotation of the driven clutch plate member 25 is arrested, the abutment surface portions 50 and 51 move into abutting relationship to arrest rotation of the actuating and output member 26 and the chain driven thereby.

Figure 6:
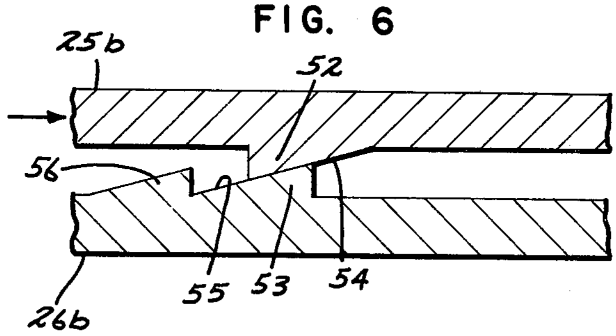
FIG. 6 is a view corresponding to FIG. 4 but showing a further modified form.

In the modified form illustrated in FIG. 6, a driven clutch plate member 25*b* and a cooperating actuating and output member 26*b* are provided with cooperating pairs of cam acting teeth 52 and 53 respectively which defined respective cam surfaces 54 and 55 that cooperate to cause expansion of the clutch assembly. At least one of the members 25*b* or 26*b* is formed to provide a lug 56 that defines a stop shoulder for abutting engagement with the tooth on the opposite member. As shown in FIG. 6, the member 26*b* is provided with the lug 56 for engagement with the adjacent end of the cam acting tooth 52 on the driven clutch plate member 26*b*.

While a commercial form and a pair of modified arrangements have been shown and described, it will be understood that the structure of this invention is capable of further modification, and that such further modification may be made without departure from the spirit and scope of the invention, as defined in the claims.

We claim:

1. In combination with power operated mechanism:

a. driving means including a drive shaft, a driving clutch plate fixed to said shaft, and a reaction member carried by said shaft and having a shoulder defining with said clutch plate a space along said shaft of known axial dimensions;

b. a clutching assembly mounted in said space and having a contracted condition in which its axial dimension is less than that of said space to engage relative rotary motion of said shaft with respect to said assembly, and an expanded condition, in which it fully occupies said space for enforcing rotation of said assembly with rotation of said shaft, said clutching assembly comprising:

1. a driven clutch plate adjacent said driving clutch plate,
2. an actuating and output member between said reaction member and said driven clutch plate and including means for engaging a driven member in driving relation,
3. and actuator means carried in part by said driven clutch plate and in part by said actuating and output member and operative responsibe to rotary speed differential between said driven clutch plate and said actuating and output member to limit rotary motion between said driven clutch plate and said actuating and output member, and to cause said assembly to vary between said contracted and expanded conditions;

c. and means operable to prevent rotation of said driven clutch plate, whereby to prevent movement of said driven member and to cause said actuator means to actuate said clutching assembly into said contracted condition.

2. The apparatus defined in claim 1 in which said actuating and output member includes a radial flange, said driven clutch plate having a circumferential rim extending axially outwardly from opposite sides thereof and overlying the outer marginal edges of said driving and driven clutch plates.

3. The apparatus defined in claim 2 in which said means to prevent rotation of said driven clutch plate comprises a brake element movable toward and away from braking engagement with said rim.

4. The apparatus defined in claim 3 in which said brake element comprises a brake band partially encompassing said rim and having a fixed end and an opposite movable end; characterized by a brake operating lever connected to said movable end for moving said band into and out of braking engagement with said rim.

5. The apparatus defined in claim 3 in which said actuator means comprises opposed cam faces and abutment portions on said driven clutch plate and said actuating and output member, and a cam follower between the opposed cam faces in engagement therewith, said cam follower moving into engagement with said abutment portions responsive to stopping of rotation of said driven clutch plate to prevent rotation of said actuating and output member.

6. In a chain saw, in combination:

a. a power driven rotary drive shaft element;

b. a radially outwardly projecting driving clutch plate fixed on said drive shaft element;

c. annular reaction means on said drive shaft element axially spaced from said driving clutch plate;

d. an axially expansible and contractible clutching assembly mounted on said drive shaft element between said driving clutch plate and said reaction means and comprising;

1. an annular driven clutch plate member journaled on said drive shaft element adjacent said drive clutch plate and having axially opposite surfaces one of which is disposed in face-to-face relationship with said drive clutch plate;
2. an actuating and output member having means for drivingly engaging a cutting chain and being journaled for rotary and axial sliding movements of said drive shaft element between the other one of said surfaces of said driven clutch plate member and said reaction means and operatively engageable with said reaction means;
3. an actuator means associated with said members for imparting relative axial clutch assembly expanding movement thereto in directions away from each other to apply frictional driving pressure to said driven clutch plate member against said driving clutch plate responsive to rotation of said driven clutch plate member at a greater speed than that of said actuating and output member in one direction of rotation thereof, said actuator means being operative to permit relative axial clutch assembly contracting movement of said members toward each other to reduce said frictional driving pressure when the speed of said driven clutch plate member is reduced below that of said actuating and output member in the same direction;

e. and means for releasably engaging said driven clutch plate member to arrest rotary movement thereof independently of said driving clutch plate.

7. The apparatus defined in claim 6 in which said actuating and output member includes a plurality of circumferentially spaced teeth for entrainment thereover of a cutting chain.

8. The apparatus defined in claim 6 in which said actuating and output member includes an annular flange in axially spaced apart relation to the other one of said opposite surfaces of said driven clutch plate member, said actuator means including a pair of opposed cam faces extending in generally parallel directions circumferentially of said members and angularly displaced from the planes of said surfaces.

9. The apparatus defined in claim 8 in which said members are formed to provide circumferentially extending grooves which define said cam faces, said actuator means comprising a ball element contained within said grooves and having rolling engagement with said faces.

10. The apparatus defined in claim 8 in which said driven clutch plate member includes a circumferential rim, said means for releasably engaging said driven clutch plate member comprising a brake element movable toward and away from frictional braking engagement with said rim, and means for imparting braking movements to said brake element.

11. The apparatus defined in claim 10 in which said rim extends axially outwardly from said axially opposite surfaces, said rim being closely radially outwardly spaced from said driving clutch plate and said actuating and output member flange.

12. In a chain saw comprising, a frame, a drive motor and a guide bar for an endless cutting chain:

a. a drive shaft element driven by said motor;

b. a radially outwardly projecting annular driving clutch plate fixed on said drive shaft element;

c. annular reaction means on said drive shaft element axially spaced from said driving clutch plate;

d. an annular driven clutch plate member journaled on said drive shaft element between said driving clutch plate and reaction means and having axially opposite surfaces, one of which is disposed in face-to-face relationship with said driving clutch plate;

e. an actuating and output member defining a plurality of circumferentially spaced sprocket teeth for entrainment thereover of said cutting chain, said actuating and output member being journaled for rotary and axial sliding movements on said drive shaft element between the other one of said surfaces of said driven clutch plate member and said reaction means and operatively engageable with said reaction means;

f. actuator means associated with said members for imparting relative axial movement thereto in directions away from each other to apply frictional driving pressure to said driven clutch plate member against said driving clutch plate responsive to rotation of said driven clutch plate member at a greater speed than that of said actuating and output member in one direction of rotation thereof, said actuator means being operative to permit relative axial movement of said members toward each other to reduce said frictional driving pressure when the speed of said driven clutch plate member is reduced below that of said actuating and output member in the same direction.

g. and means for releasably engaging said driven clutch plate member to arrest rotary movement thereof independently of said driving clutch plate.

* * * * *

UNITED STATES PATENT AND TRADEMARK OFFICE

CERTIFICATE OF CORRECTION

PATENT NO. : 4,033,038 Page 1 of 2

DATED : July 5, 1977

INVENTOR(S) : James M. Lunde and John G. Schwartz, Jr.

It is certified that error appears in the above-identified patent and that said Letters Patent are hereby corrected as shown below:

Column 1, line 39, the word "engaing" should be changed to --engaging--.

Column 1, line 52, the phrase "into contracted" should be changed to --into said contracted--.

Column 2, line 5, the word "fragmentary" should be changed to --fragmentarily--.

Column 2, lines 54 and 55, the word "relationships" should be changed to --relationship--.

Column 3, line 11, the numeral "37" should be changed to --27--.

Column 3, line 20, the word "sperical" should be changed to --spherical--.

Column 3, line 35, the word "a" should be changed to --the--.

Column 3, line 59, the word "line" should be changed to --link--.

Column 4, line 20, the word "sperical" should be changed to --spherical--.

UNITED STATES PATENT AND TRADEMARK OFFICE

CERTIFICATE OF CORRECTION

PATENT NO. : 4,033,038

DATED : July 5, 1977

INVENTOR(S) : James M. Lunde and John G. Schwartz, Jr.

It is certified that error appears in the above-identified patent and that said Letters Patent are hereby corrected as shown below:

Column 5, line 25, the word "defined" should be changed to --define--.

Column 5, line 32, the numeral "26b" should be changed to --25b--.

Column 6, line 26, the word "the" should be changed to --said--.

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*